United States Patent
Bannier et al.

(10) Patent No.: US 6,595,797 B2
(45) Date of Patent: Jul. 22, 2003

(54) UNIT OF EQUIPMENT FOR A MOTOR VEHICLE COMPRISING IMPROVED ELECTRICAL CONNECTION AND ATTACHMENT MEANS

(75) Inventors: Christine Bannier, Audincourt (FR); Denis Bocquet, Belfort (FR); Jean-Luc Roudot, Essert (FR); Christian Henigue, Audincourt (FR)

(73) Assignee: Faurecia Industries, Boulogne Billancourt (FR)

( * ) Notice: Subject to any disclaimer, the term of this patent is extended or adjusted under 35 U.S.C. 154(b) by 0 days.

(21) Appl. No.: 10/012,556

(22) Filed: Dec. 12, 2001

(65) Prior Publication Data
US 2002/0090838 A1 Jul. 11, 2002

(30) Foreign Application Priority Data
Dec. 12, 2000 (FR) .............................. 00 16166

(51) Int. Cl.[7] .............................................. H01L 13/60
(52) U.S. Cl. ....................................... 439/527; 439/246
(58) Field of Search .......................... 439/527, 677, 439/680, 701, 571, 572, 609, 297, 247, 248, 246

(56) References Cited

U.S. PATENT DOCUMENTS

| 4,313,584 A | | 2/1982 | Fukunaga ................... 248/27.3 |
| 4,998,889 A | * | 3/1991 | Moly .......................... 439/247 |
| 5,788,532 A | * | 8/1998 | Takiguchi et al. ........... 439/374 |
| 5,873,749 A | | 2/1999 | Takiguchi et al. ........... 439/534 |
| 5,917,152 A | | 6/1999 | Kameyama ................ 174/72 A |
| 5,931,682 A | | 8/1999 | Takiguchi et al. ............. 439/34 |
| 6,053,758 A | | 4/2000 | Kato et al. ................... 439/364 |

* cited by examiner

Primary Examiner—P. Austin Bradley
Assistant Examiner—Ross Gushi
(74) Attorney, Agent, or Firm—Young & Thompson

(57) ABSTRACT

An electrical connection for a motor vehicle includes a first piece of equipment (1), a second piece of equipment (14) adapted to be assembled to the first piece, a first (7) and a second (28) complementary electrical connector part attached respectively to the first and second pieces of equipment, each of the pieces of equipment (1, 14) being provided respectively with a first (9) and second (30) guiding and positioning member, cooperating with the respective connector parts. The first (9) and second (30) guiding and positioning members are complementary and adapted to cooperate together in order to guide and position the second piece of equipment (14) over the first (1).

10 Claims, 4 Drawing Sheets

UNIT OF EQUIPMENT FOR A MOTOR VEHICLE COMPRISING IMPROVED ELECTRICAL CONNECTION AND ATTACHMENT MEANS

BACKGROUND OF THE INVENTION

The invention relates to the field of equipment for motor vehicles.

In particular, the invention relates to a unit of equipment for a motor vehicle comprising:

a first part of an electrical connector mounted on a first piece of equipment, the first piece of equipment comprising a first guiding and positioning member allowing the relative guiding and positioning of the first part of an electrical connector on the first piece of equipment, a second part of an electrical connector, the complement of the first part of an electrical connector, mounted on a second piece of equipment, the second piece of equipment comprising a second guiding and positioning member allowing the relative guiding and positioning of the second part of an electrical connector on the second piece of equipment, the said second piece of equipment being mounted on the said first piece of equipment, the first and second parts of the electrical connector being connected one to the other, and each piece of equipment comprising complementary guiding and positioning means allowing the relative guiding and positioning of the said pieces of equipment with each other, and the connection of the said parts of an electrical connector with each other.

The assembly of equipment comprising electrical connections on other equipment already attached or prepositioned on the vehicle poses considerable problems in handling and requires operations which are difficult to automate. For example, the assembly of an instrument panel, which comprises electrically powered displays, onto the dashboard, the latter already being in place inside the vehicle, is generally carried out as follows: the operator approaches, from the inside of the vehicle, the instrument panel which comprises on its rear face an electrical connector casing, takes hold of the equivalent connector cabled through the inside of the cavity of the dashboard provided to receive the instrument panel; he must then assemble the connectors while keeping the instrument panel close to the receiving cavity where, inside the latter, the length of cable is provided with a short overlength with respect to the assembled position of the instrument panel in the dashboard.

This handling is not only complex, but is not compatible with implementing an automated assembly method, and consequently constitutes a considerable obstacle to achieving increases in productivity.

A main aim of the invention is to make the assembly operations of the type described above less tiresome and more simple for an operator, and even to automate the operation.

SUMMARY OF THE INVENTION

To this end, according to the invention, the unit of equipment inside the motor vehicle is characterized in that the complementary guiding and positioning means comprise the first and second members for guiding and positioning the first and second electrical connector parts respectively on the first and second pieces of equipment.

According to other characteristics of the invention:

the guiding and positioning members are complementary rails lying in a substantially straight manner in the mating direction of the connector parts;

one of the connector parts is secured to a printed circuit board;

the said board is a visible piece, which can be seen from the inside of the vehicle when the unit is mounted on the vehicle; and at least one of the connector parts is a casing in which contacts are housed.

According to a first embodiment of the invention, the two connector parts are casings which are the complement of each other, in each of which are housed respective contacts, the complement of those housed in the equivalent connector casing.

According to a second embodiment of the invention, one of the connector parts is a casing in which pressure-type contacts are housed, whereas the other of the connector parts comprises a printed circuit board with conducting surfaces, the said boards receiving the said pressure-type contacts bearing thereon.

According to this embodiment, advantageously, a form of guiding and positioning, the complement of the associated guiding and positioning member is directly formed on the board so that the connector part corresponding to the printed circuit board cooperates with the said guiding and positioning member.

The invention, as will be illustrated below, is most particularly applicable to attaching electrical equipment to a dashboard, a door panel, a central console, a seat or even a roof.

This electrical equipment may constitute, as has already been mentioned, an instrument panel, but also a car radio, a control console or a display.

BRIEF DESCRIPTION OF THE DRAWINGS

Exemplary embodiments of the invention will now be described with reference to the appended drawings in which.

DESCRIPTION OF THE PREFERRED EMBODIMENTS

Figure 1:
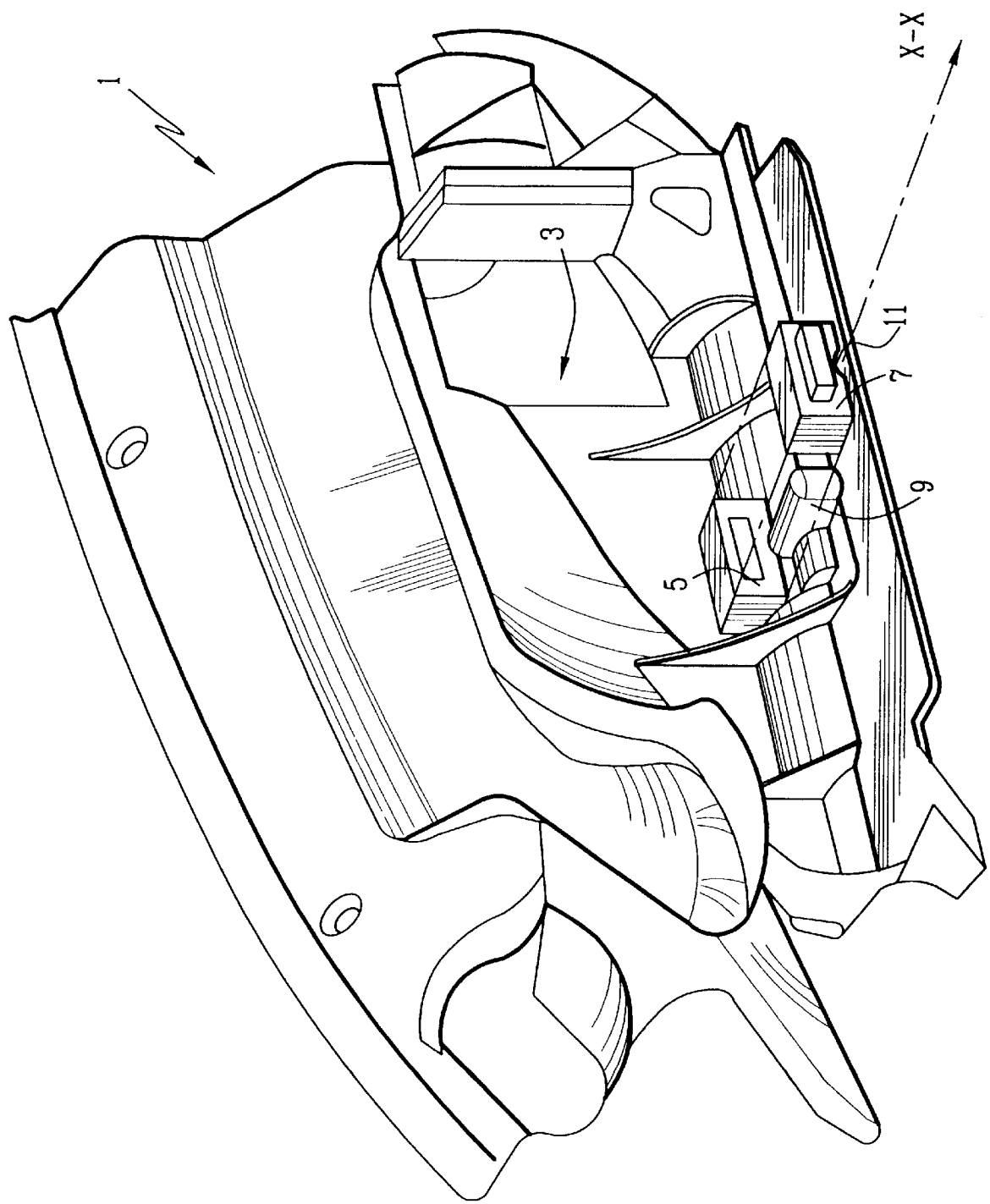
FIG. 1 is a schematic view in perspective, from the inside of a vehicle, of a dashboard and of an associated connector part according to a first embodiment of the invention, the two pieces being shown separated.

FIG. 1 shows part of a dashboard 1, in which a cavity 3 is made. The dashboard 1 constitutes a first piece of equipment attached inside the vehicle and intended to receive in its cavity 3 a second piece of equipment consisting of an instrument panel, which will be described with reference to FIG. 2.

A block 5 for receiving and attaching a male electrical connector 7 is formed in a lower part of the cavity 3 on the dashboard 1. The male electrical connector 7 is shown alone, it being understood that it is, in reality, in the configuration shown, cabled. The bundle of cables connected to the male electrical connector 7 is not shown, and it winds its way in a conventional manner from the engine compartment to the connector 7, itself placed in the passenger compartment, thereby passing through the cavity 3. The cable bundle could equally come from the dashboard 1 itself.

The reception and attachment block 5 comprises attachment means for the male electrical connector 7, of conventional type, for example snap-fastening, screwing, crimping or other means; these attachment means have therefore not been shown.

A rail 9, moulded with the dashboard 1, lies along the longitudinal axis X—X of the vehicle from the reception and attachment block 5 in the direction of the passenger compartment, the direction of the passenger compartment being marked on the figure by the orientation of the vehicle axis X—X. The rail 9 has a reverse U-shaped cross section and cooperates with a notch 11 of complementary shape emerging on a lower face of the male electrical connector 7.

The rail 9 constitutes a member for guiding and positioning the male electrical connector 7 with respect to the dashboard 1 and in particular with respect to the cavity 3. By cooperation of the notch 11 with the rail 9, the male electrical connector 7 is guided, when it is attached to the dashboard 1, longitudinally up to the block 5, and is positioned accurately with respect to the latter.

Figure 2:
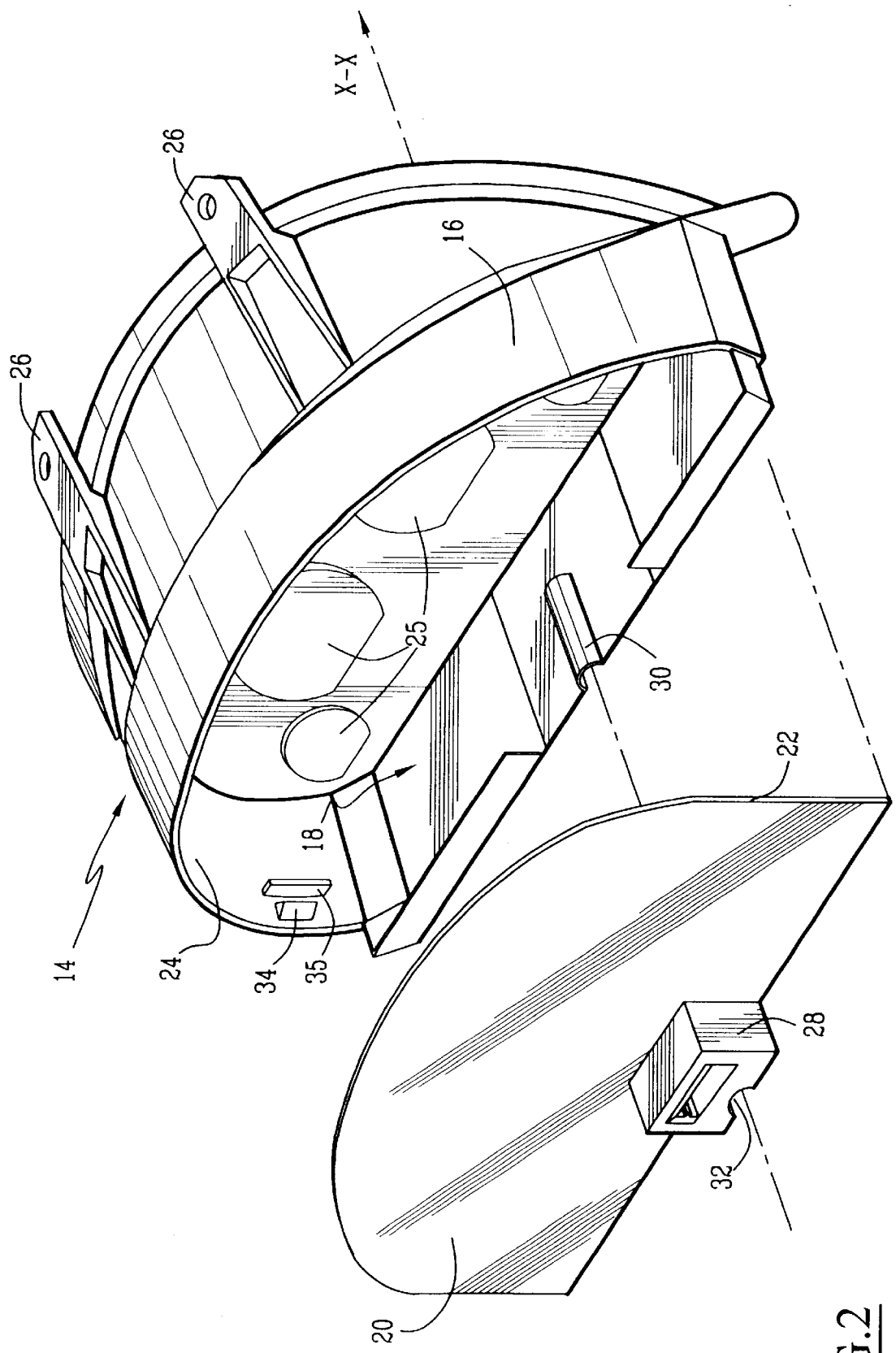
FIG. 2 is a similar view of an instrument panel and of an associated connector part.

With reference to FIG. 2, the second piece of equipment constituting an instrument panel 14, of external shape the complement of the cavity 3, will now be described.

Here, the longitudinal axis X—X of the vehicle, oriented towards the passenger compartment of the vehicle, is again shown.

The instrument panel 14 comprises, for example, electrical displays and dials, which are not visible in the figure since the instrument panel 14 is oriented so that its part intended to engage with the cavity 3 of the dashboard 1 is shown.

From this side, the instrument panel 14 has a flange 16 delimiting a container 18. This container 18 receives a back board 20, the outer edges 22 of which are designed to coincide with the inner edges 24 of the flange 16.

Since the back board 20 consists of a printed circuit, the face turned towards the inside of the vehicle of which supports indicator lights, dials or other displays, it constitutes a visible piece which can be seen by a user placed in the passenger compartment of the vehicle. These indicator lights, dials, displays, etc., can be seen from the inside of the vehicle through windows 25 with respect to which they must be positioned accurately. It is therefore important that the back board 20 is positioned accurately in the container 18.

Conventional members 26 for attaching the instrument panel 14 to the dashboard 1 are placed on the outer periphery of the instrument panel 14.

The back board 20 is secured to a female electrical connector 28, the complement of the male electrical connector 7 attached to the dashboard 1.

A straight rail 30, lying along the longitudinal axis X—X of the vehicle, is formed on a lower inner face of the flange 16 of the instrument panel 14. The rail 30 has a reverse U-shaped cross section, the complement of a notch 32 emerging on a lower face of the female electrical connector 28.

The rail 30 constitutes a member for guiding and positioning the female connector 28 and securing the back board 20 to the instrument panel 14, since the female connector 28 is likely to slide over the upper surface of the rail 30, during assembly of the female connector 28 and of the back board 20 in the container 18. The unit formed by the female connector 28 and by the back board 20 is locked into position by elastically deformable lugs 34 placed on the inner edges 24 of the flange 16 and cooperating with the outer edges 22 of the back board 20, and by the axial stops 35.

Figure 3:
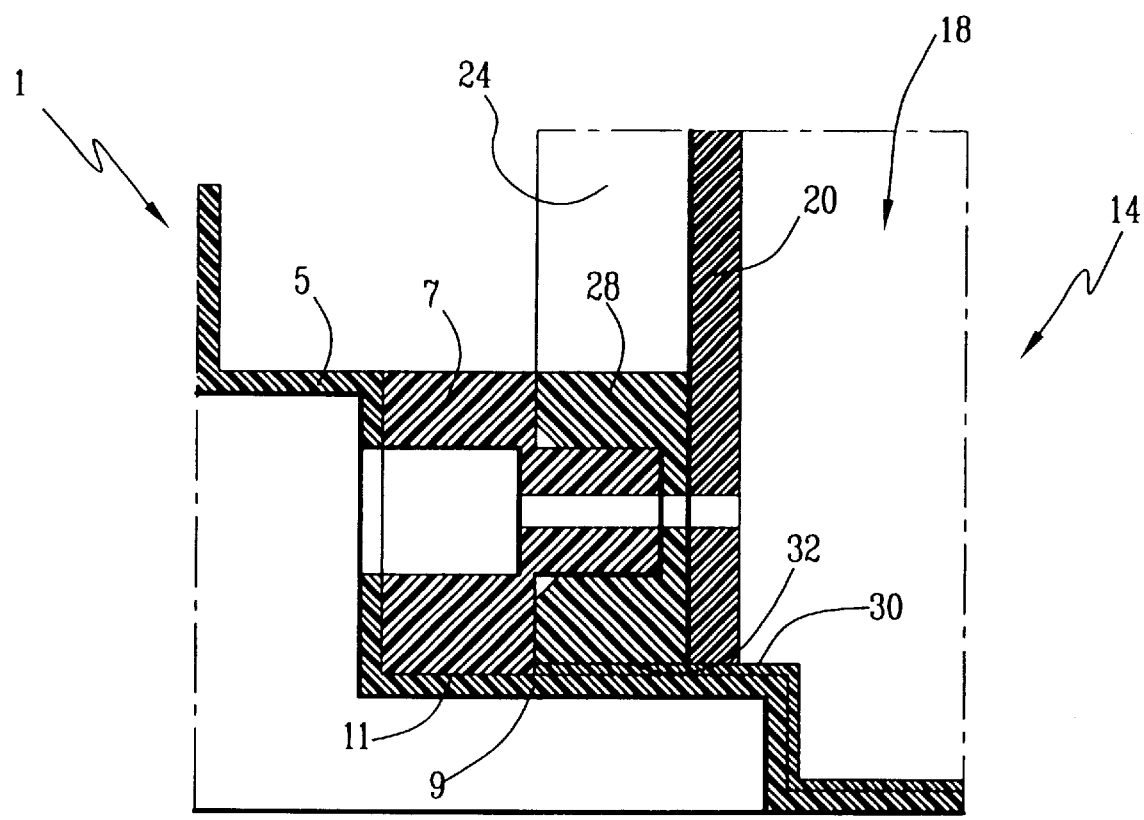
FIG. 3 is a sectional view in a mid-plane of the connectors passing through the longitudinal axis of the guide rails, of the assembly consisting of the pieces shown in the above figures, the dashboard and the instrument panel being provided with their respective connectors and ready to be assembled.

FIG. 3 shows each of the subassemblies consisting, on the one hand, of the dashboard 1 and the associated male electrical connector 7 and, on the other hand, of the instrument panel 14 and the female electrical connector 28 (and the back board 20 securely attached), each of the subassemblies being in the assembled position.

The two subassemblies have been shown facing one another, ready to be assembled, so that it is understood that the rail 30, by means of its lower surface, is adapted to cooperate with the rail 9. This is because the assembled subassembly formed by the instrument panel 14, the female connector 28 and the back board 20 can slide over the rail 9 up to the complete insertion position of the instrument panel 14 in the cavity 3, on the one hand, and of the male electrical connector 7 in the female electrical connector 28, on the other hand.

Figure 4:
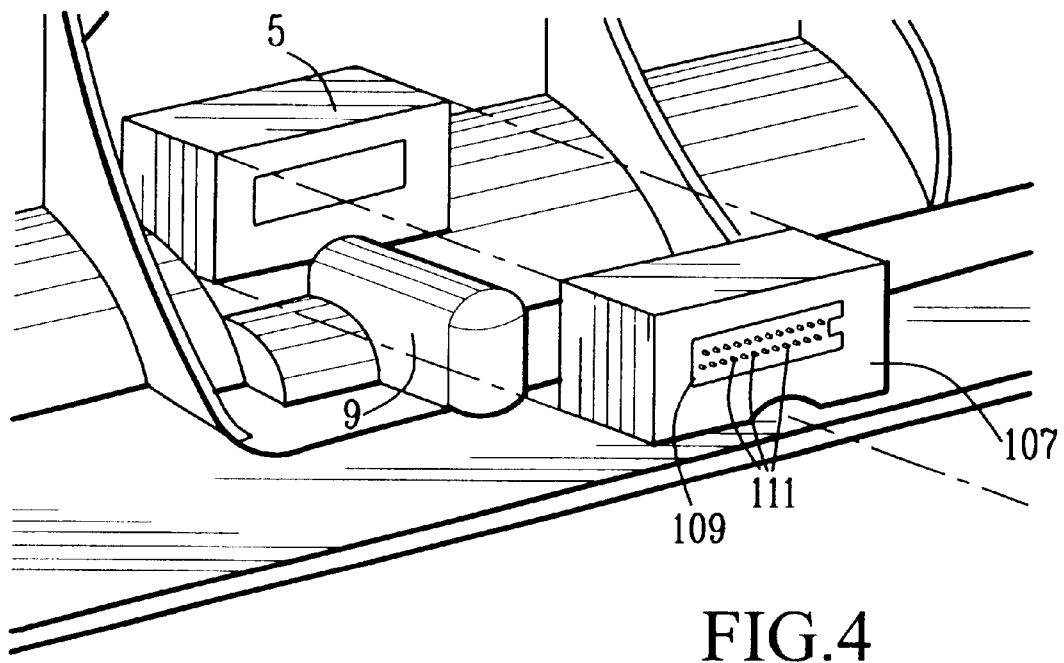
FIG. 4 is an enlarged detail view, in the region of the guide rail, of part of the dashboard of FIG. 1 and of an associated connector part according to a second embodiment of the invention.

With reference to FIG. 4, a second embodiment of the invention, in which a connection called a "pressure" connection is substituted for the connection of the "current" type, which is the subject of the first embodiment of the invention, will now be described with reference to FIGS. 1 to 3.

In this figure, of the dashboard, only the region comprising the attachment block 5 and the guide rail 9 are shown, on a greater scale than that of FIG. 1.

The connector part 107 designed to be attached to the block 5 consists of a casing in which a contact-carrying module 109 is housed. Contacts 111 are inserted and held in the contact-carrying module 109, the said contacts 111 being of the "pressure" type, that is to say that they are designed to cooperate with a conducting surface by bearing thereon. For this purpose, the contacts 111 are mounted in the contact-carrying module 109 so as to slightly exceed the said contact-carrying module 109 in the direction of the equivalent connector, the two connector parts being, when they are mated, held together with a suitable clamping force.

Figure 5:
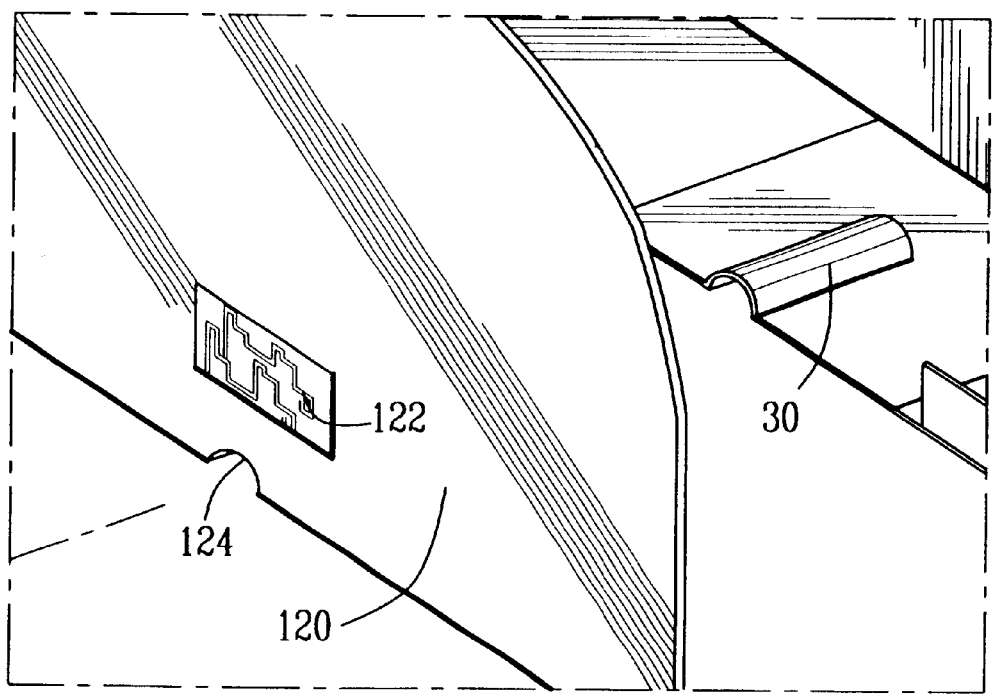
FIG. 5 is a similar view of part of an instrument panel and of part of the associated printed circuit board according to a second embodiment of the invention.

The connector equivalent associated with the first part 107 will now be described briefly with reference to FIG. 5.

In this figure, an instrument panel of the type shown in FIG. 2 is also shown, in its region comprising the guide rail 30. The second connector part 120 associated with the first part 107 mainly constitutes a printed circuit board similar to the board 20 of the first embodiment. Conductive tracks 122 designed to receive pressure contacts 111 bearing thereon are formed on this printed circuit board.

The mutual means for locking and clamping the two connector parts 107, 120 have not been shown, but it is understood that they can be of any suitable type, and act directly or indirectly on the connector parts 107, 120.

A guiding form 124, the complement of the rail 30, is made directly in the printed circuit board under the configuration of a notch, the complement of the rail 30.

This second embodiment illustrates that the invention cannot be limited to the most common type of connection, in which the two complementary connector parts consist of a male casing and of a female casing. In contrast, the invention is designed for numerous types of connectors and of vehicle equipment.

It is therefore understood that the guiding and positioning members 9, 30 make it possible not only to accurately position the corresponding electrical connector 7, 28; 107, 120 on the associated piece of equipment 1, 14, but also to provide accurate positioning of the connectors 7, 28; 107, 120 one with respect to the other, and simultaneously of the pieces of equipment 1, 14 one with respect to the other.

This positioning is carried out with respect to a single reference consisting of the rail 9, since all the pieces of the unit are centred thereon. The result of this is that the problems of positioning pieces of equipment one with respect to the other, which have a significant impact on the aesthetics of the inside of the vehicle, and the problems of aligning connector parts prior to their mating are resolved simultaneously, by common means.

What is claimed is:

1. A unit of equipment for a motor vehicle comprising:
   a first part of an electrical connector (7; 107) mounted on a first piece of equipment (1), the first piece of equipment (1) comprising a first guiding and positioning member (9) allowing the relative guiding and positioning of the first part of an electrical connector (7; 107) on the first piece of equipment (1),
   a second part of an electrical connector (28; 120) which is the complement of the first part of an electrical connector (7; 107), mounted on a second piece of equipment (14), the second piece of equipment (14) comprising a second guiding and positioning member (30) allowing the relative guiding and positioning of the second part of an electrical connector (28; 120) on the second piece of equipment (14),
   the second piece of equipment (14) being mounted on the first piece of equipment (1), the first (7; 107) and second (28; 120) parts of the electrical connector being connected one to the other, and each piece of equipment (1, 14) comprising complementary guiding and positioning means allowing the relative guiding and positioning of the pieces of equipment (1, 14) with each other, and the connection of the parts of an electrical connector (7; 107), (28; 120) with each other,
   wherein the complementary guiding and positioning means comprise the first (9) and second (30) members for guiding and positioning the first (7; 107) and second (28; 120) electrical connector parts respectively on the first (1) and second (14) pieces of equipment,
   wherein the first and second guiding and positioning members (9, 30) are complementary rails extending in a substantially straight manner in a mating direction of the first and second parts (7, 28; 107, 120).

2. The unit of equipment according to claim 1, wherein at least one (7, 28; 107) of the first and second parts is a casing in which contacts (111) are housed.

3. The unit of equipment according to claim 2, wherein both the first and second parts (7, 28) are casings in each of which are housed respective ones of the contacts that complement ones of the contacts housed in the other of the casings (7, 28).

4. The unit of equipment according to claim 1, wherein the first piece of equipment is one of a dashboard (1), a door panel, a central console, a seat, and a roof.

5. The unit of equipment according to claim 4, wherein the second piece of equipment is one of an instrument panel (14), a car radio, a control console, and a display.

6. The unit of equipment according to claim 1, wherein one (28; 120) of the first and second parts is secured to a printed circuit board (20; 120).

7. The unit of equipment according to claim 6, wherein said board (20; 120) is a visible piece, which can be seen from inside of a vehicle when the unit is mounted on the vehicle.

8. The unit of equipment according to claim 6, wherein one (107) of the first and second parts is a casing in which pressure-type contacts (111) are housed and the other (120) of the first and second parts comprises a printed circuit board with conducting surfaces (122) having said pressure-type contacts (111) bearing thereon.

9. The unit of equipment according to claim 8, further comprising a guiding and positioning form (124) that is the complement of the second guiding and positioning member (30) and is directly formed on the board (120).

10. A unit of equipment for a motor vehicle comprising:
    a first part of an electrical connector mounted on a first piece of equipment, the first piece of equipment comprising a first rail that relatively guides and positions the first part on the first piece of equipment; and
    a second part of an electrical connector that is a complement of the first part and that is mounted on a second piece of equipment, the second piece of equipment comprising a second rail that is a complement of the first rail and that relatively guides and positions the second part on the second piece of equipment,
    wherein the first and second rails extend substantially straight in a mating direction of the first and second parts,
    wherein the second piece of equipment is mounted on the first piece of equipment and the first and second parts are connected to the other, and
    wherein the first and second rails relatively guide and position the first and second pieces of equipment with respect to each other and the first and second parts with respect to each other.

* * * * *